(12) United States Patent
Ruiz

(10) Patent No.: US 6,526,878 B2
(45) Date of Patent: Mar. 4, 2003

(54) DEVICE AND METHOD FOR CONTROLLING PRESSURE IN BINDING MEDIA

(75) Inventor: Israel Cruz Ruiz, Jalisco, ME (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/921,133

(22) Filed: Aug. 3, 2001

(65) Prior Publication Data
US 2003/0024409 A1 Feb. 6, 2003

(51) Int. Cl.[7] ............................................. B30B 15/34
(52) U.S. Cl. ..................... 100/38; 100/50; 100/289; 100/320; 156/359
(58) Field of Search .................. 100/38, 50, 52, 100/289, 320; 156/359, 552, 565; 318/369, 632, 685, 696

(56) References Cited

U.S. PATENT DOCUMENTS

| | | | | |
|---|---|---|---|---|
| 3,788,211 A | * | 1/1974 | Mason, Jr. | 100/320 |
| 4,007,678 A | * | 2/1977 | Gustavsson et al. | 100/52 |
| 4,953,109 A | * | 8/1990 | Burgis | 100/50 |
| 5,067,398 A | * | 11/1991 | Thoma | 100/289 |
| 5,115,735 A | * | 5/1992 | Gloe et al. | 100/43 |
| 5,231,922 A | * | 8/1993 | Ohta et al. | 100/320 |
| 5,483,874 A | * | 1/1996 | Shimizu et al. | 100/50 |

* cited by examiner

Primary Examiner—W. Donald Bray

(57) ABSTRACT

A media binding device is operable to apply pressure on a plurality of media sheets, while applying heat to melt adhesive provided between the sheets of media. The media binding device may be implemented in conjunction with an image forming device, e.g., printer, facsimile machine, photocopier, etc. More specifically, the media binding device may be implemented in a position generally at an output end of the image forming device, following a collating or stacking of the printed media. The media binding device applies a predetermined amount of pressure on the plurality of media sheets. In this respect, the media binding device operates to apply a gradually increasing amount of pressure onto the media sheets until a predetermined amount of pressure is reached. The predetermined pressure is applied on the media sheets by shutting off the current flowing into a motor operating the media binding device when a predetermined current level is reached. By virtue of the fact that the amount of current flowing into the motor is substantially proportional to the amount of torque produced by the motor, the amount of torque, and thus, the amount of pressure on the media sheets, may consequently be controlled by controlling the amount of current supplied to the motor.

20 Claims, 2 Drawing Sheets

DEVICE AND METHOD FOR CONTROLLING PRESSURE IN BINDING MEDIA

FIELD OF THE INVENTION

This invention relates generally to mechanical presses. More particularly, the present invention relates to mechanical presses intended to apply a relatively constant, predetermined clamping force upon work pieces regardless of the thickness of the work piece and a method for controlling the relatively constant, predetermined clamping force.

BACKGROUND OF THE INVENTION

It is generally known to control the amount of pressure (clamping force) applied upon a work piece. A known manner of relatively effectively controlling the pressure applied upon the work piece is through the use of load cells (i.e., pressure sensors). One disadvantage associated with the use of load cells, is that, load cells typically require additional parts, including electronic components, which typically results in both additional cost and additional space requirements.

Another generally known manner of controlling the pressure applied upon a work piece involves the use of an optical sensor or a position sensor that detects the position of at least one part of the press. Depending on the size, i.e., thickness, of the work piece, a consistent level of pressure may be relatively difficult to apply on the work piece. For example, relatively thin work pieces may have relatively low amounts of pressure applied thereon, whereas relatively thick work pieces may have relatively higher amounts of pressure applied thereon.

In binding a plurality of sheets of media, e.g., sheets of paper, having thermally activated adhesive positioned between the sheets, it is generally known to apply both heat and pressure upon the sheets. In this respect, the amount of pressure applied on the sheets of media directly affects the amount of heat transferred between the sheets of media, thus affecting the heat distribution through the media and the activation of the adhesive between the sheets. In one regard, if relatively excessive amounts of pressure are applied onto the sheets of media, the heat transfer between a heat source and the sheets of media may be exceedingly high, thereby resulting in damage to the sheets. For example, the sheets may become burned, thus potentially turning yellow. Otherwise, if a sufficient amount of pressure is not applied to the sheets, thus resulting in poor contact between the heat source and the sheets, as well as between the sheets themselves, the heat from the heat source may not easily flow from one sheet to another, potentially resulting in poor binding of the sheets.

SUMMARY OF THE INVENTION

In accordance with one aspect, the present invention pertains to a press for binding media sheets. The press includes a first plate and a second plate, with a space formed between the first plate and the second plate. The space is sufficiently large to enable a plurality of sheets of media to be inserted into the space. The press also includes a DC motor for manipulating a jack device, such that a position of at least one of the first and second plates is varied in response to manipulation of the jack device. A power source is also included for supplying power to the DC motor. A sensor for detecting a value of current flowing from said power source to the DC motor and a controller for controlling power supply to the DC motor are additionally included. The controller is configured to shut off the power supply to the DC motor in response to the value of current reaching a predetermined value. Furthermore, the press also includes a heat source for supplying heat to the first plate and the second plate, such that heat is configured to be transferred to a plurality of sheets insertable into the space between the first plate and the second plate to thereby bind the plurality of sheets together.

According to another aspect, the present invention pertains to a method for binding a plurality of media sheets with a press having a first plate and a second plate spaced from the first plate, with at least one of the first and second plates being movable by operation of a DC motor. In the method, at least an edge of a plurality of media sheets is inserted into the space provided between the first plate and the second plate. The DC motor is supplied with a current from a power source to thereby activate the DC motor to maneuver at least one of the first plate and the second plate in a direction towards the plurality of media sheets. Additionally, the supply of current into the DC motor is controlled and sensed. Furthermore, an amount of pressure applied on the plurality of media sheets by each of the first plate and the second plate is controlled by controlling the amount of current flowing into the DC motor.

According to yet another aspect, the present invention pertains to a method for controlling pressure applied onto a plurality of print media sheets by a print media binding device having a first plate and a second plate, in which at least one of the first and second plates is maneuverable by a DC motor. In the method, at least one of the first and second plates is maneuvered into substantial contact with the plurality of print media sheets. Additionally, a substantially constant pressure is applied on the plurality of print media sheets by the first plate and the second plate by substantially shutting off the current flowing into the DC motor when the current flowing into the DC motor reaches a predetermined level.

According to the principles of the present invention, certain aspects of the invention are capable of achieving certain advantages, including the application of a predetermined amount of clamping force to bind a plurality of media sheets together without suffering from some of the drawbacks and disadvantages associated with known media binding processes.

BRIEF DESCRIPTION OF THE DRAWINGS

Features and advantages of the present invention will become apparent to those skilled in the art from the following description with reference to the drawings, in which.

DETAILED DESCRIPTION OF THE INVENTION

For simplicity and illustrative purposes, the principles of the present invention are described by referring mainly to an exemplary embodiment thereof, particularly with references to a document binding device. However, one of ordinary skill in the art would readily recognize that the same principles are equally applicable to, and can be implemented in, any device that applies pressure onto any type of work piece, and that any such variation would be within such modifications that do not depart from the true spirit and scope of the present invention.

According to an aspect of the present invention, a media binding device is operable to apply pressure on a plurality of media sheets, while applying heat to melt adhesive located between the sheets of media. In this respect, the media binding device of the present invention may be implemented in conjunction with an image forming device (not shown), e.g., printer, facsimile machine, photocopier, etc. More specifically, the media binding device of the present invention may be implemented in a position generally at an output end of the image forming device, following a collating or stacking of the printed media.

The media binding device of the present invention is operable to apply a predetermined amount of pressure on the plurality of media sheets. In this respect, the media binding device operates to apply a gradually increasing amount of pressure onto the media sheets until a predetermined amount of pressure is reached. According to a preferred embodiment, the predetermined pressure may be applied on the media sheets by shutting off the current flowing into a motor operating the media binding device when a predetermined current level is reached. By virtue of the fact that the amount of current flowing into the motor is substantially proportional to the amount of torque produced by the motor, the amount of torque, and thus, the amount of pressure on the media sheets, may consequently be controlled by controlling the amount of current flowing into the motor.

Figure 1:
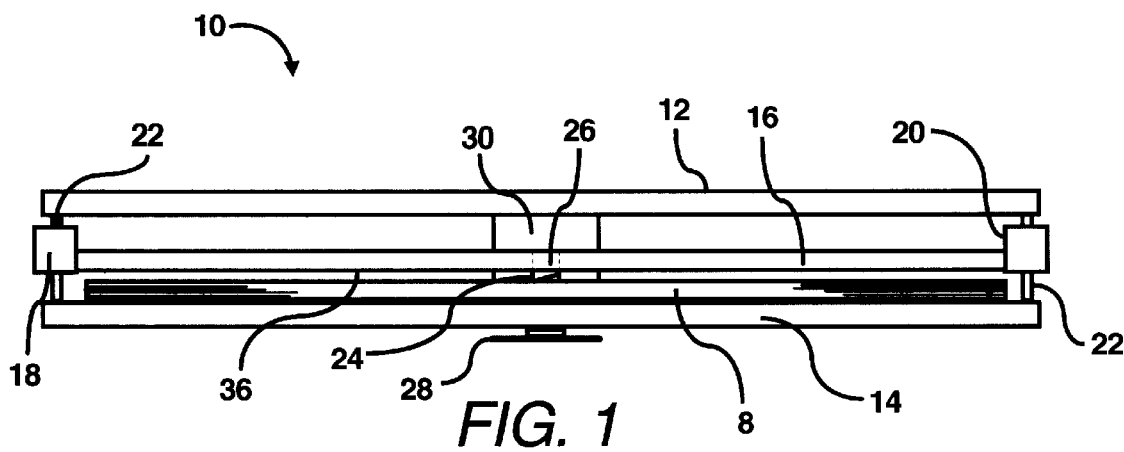
FIG. 1 is an outer schematic view illustrating a device for applying pressure and heat to bind a plurality of media sheets.

FIG. 1 is an outer schematic view illustrating a device 10 for applying pressure and heat to bind a plurality of media sheets 8. As illustrated in FIG. 1, according to a preferred embodiment of the present invention, the pressure and heat applying device 10 includes a first plate 12, a second plate 14, and a movable plate 16. However, the pressure and heat applying device 10 is not limited three plates, but rather, may include two or more plates without deviating from the scope and spirit of the present invention. Additionally, it is also envisioned that the present invention may be configured for the first plate 12 and/or the second plate 14 to be movable along with the movable plate 16.

A space 36 is provided between the movable plate 16 and second plate 14 to receive the plurality of media sheets 8. The movable plate 16 possesses a pair of sliding members 18, 20 positioned on opposite ends of the movable plate. The sliding members 18, 20 may comprise separate elements attached to the ends of the movable plate 16 or they may be integrally formed with the movable plate. The first plate 12 is attached to the second plate 14 through a plurality of rod members 22. Although only two rod members 22 are visible in FIG. 1, according to a preferred embodiment of the present invention, four rod members 22 are positioned substantially adjacent to the corners of the first plate 12 and the second plate 14. Additionally, it is within the scope and spirit of the present invention that the device 10 may include any reasonably suitable number of rod members 22. Additionally, although not shown in FIG. 1, each of the sliding members 18, 20 includes a pair of openings through which the rod members 22 extend. The openings through which the rod members 22 extend are configured to enable the movable plate 16 to relatively freely slide along the rod members.

Also illustrated in FIG. 1 are a plurality of mechanisms operable to manipulate the movable plate 16 with respect to the first and second plates 12, 14. More specifically, the movable plate 16 is operable to be manipulated by rotation of a threaded jack member 24. In this respect, the movable plate 16 includes a threaded opening 26 through which the threaded jack member 24 is configured to mate. Thus, by virtue of the rotation of the threaded jack member 24, the movable plate 16 is caused to travel generally toward or away from the second plate 14. Additionally, at least by virtue of the threaded engagement between the threaded jack member 24 and the threaded opening 26, when the threaded jack member is not rotated, the movable plate maintains its position on the threaded jack member.

As further illustrated in FIG. 1, a first gear 28 having a plurality of teeth is attached to the threaded jack member 24, such that rotation of the first gear causes a likewise rotation of the threaded jack member. Additionally, a DC motor 30 is positioned to cause rotation of the first gear 28 and thereby rotate the threaded jack member 24 to manipulate the position of the movable plate 16. Although any reasonably suitable type of DC motor may be utilized in the operation of the present invention, according to a preferred embodiment of the present invention, the DC motor 30 is a reversible-type of motor to thus enable the movable plate 16 to be maneuvered in both directions with respect to the first and second plates 12, 14.

Figure 2:
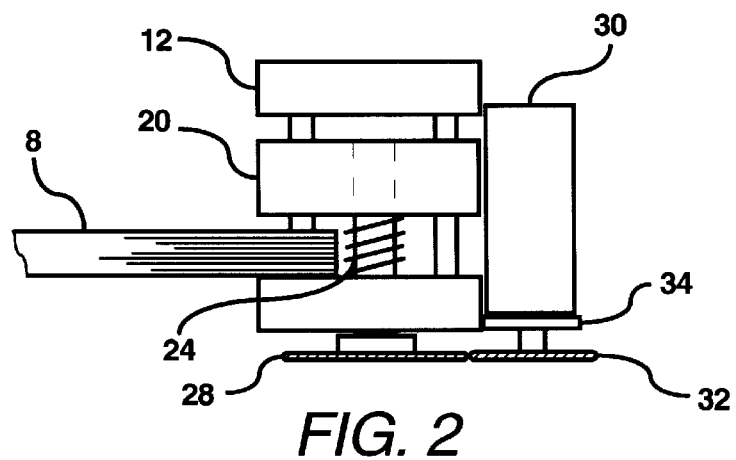
FIG. 2 is an enlarged side view of the device illustrated in FIG. 1.

Referring now to FIG. 2, which is an enlarged side view of the device 10 illustrated in FIG. 1, various other aspects of the present invention may be distinguished. As seen in FIG. 2, the DC motor 30 is illustrated as positioned upon a motor support member 34 extending from the second plate 14. The motor support member 34 may be attached to the second plate 14 by any reasonably suitable fastening methods, e.g., adhesive, welding, mechanical fasteners, or the motor support member may be integrally formed with the second plate. Although FIG. 2 illustrates that the DC motor 30 is positioned generally behind the device 10, it is within the scope and spirit of the present invention that the DC motor 30 may be situated in any position with respect to the device 10 which enables the DC motor to manipulate the movable member 16.

As additionally illustrated in FIG. 2, the DC motor 30 includes a second gear 32 that is configured for rotation by operation of the DC motor. The second gear 32 possesses a plurality of teeth that are engageable with the teeth of the first gear 28. Thus, by virtue of the rotation of the second gear 32 caused by the DC motor 30, the first gear 28 is also caused to be rotated. By rotating the first gear 28, the threaded jack member 24 may be rotated within the threaded opening 26 thereby causing the movable plate 16 to be maneuvered either away from or towards the second plate 14. Although FIG. 2 illustrates that two gears 28 and 32 are utilized to rotate the threaded jack member 24, it is within the purview of the present invention that any number of gears may be implemented, or the DC motor 30 may be directly attached to the jack member 24 without deviating from the scope and spirit of the present invention.

As power in the form of a current is supplied to the DC motor 30, thereby causing the second gear 32 to rotate and thus the jack member 24 to rotate, the movable plate 16 is caused to move towards or away from the second plate 14. Once the power is shut off, the movable plate 16 maintains its position with respect to the second plate 14 by virtue of the threaded connection between the threaded jack member 24 and the threaded opening 26. Thus, the space 36 between the second plate 14 and the movable plate 16 for receiving the media sheets 8 may be varied and maintained at a predetermined level.

Figure 3:
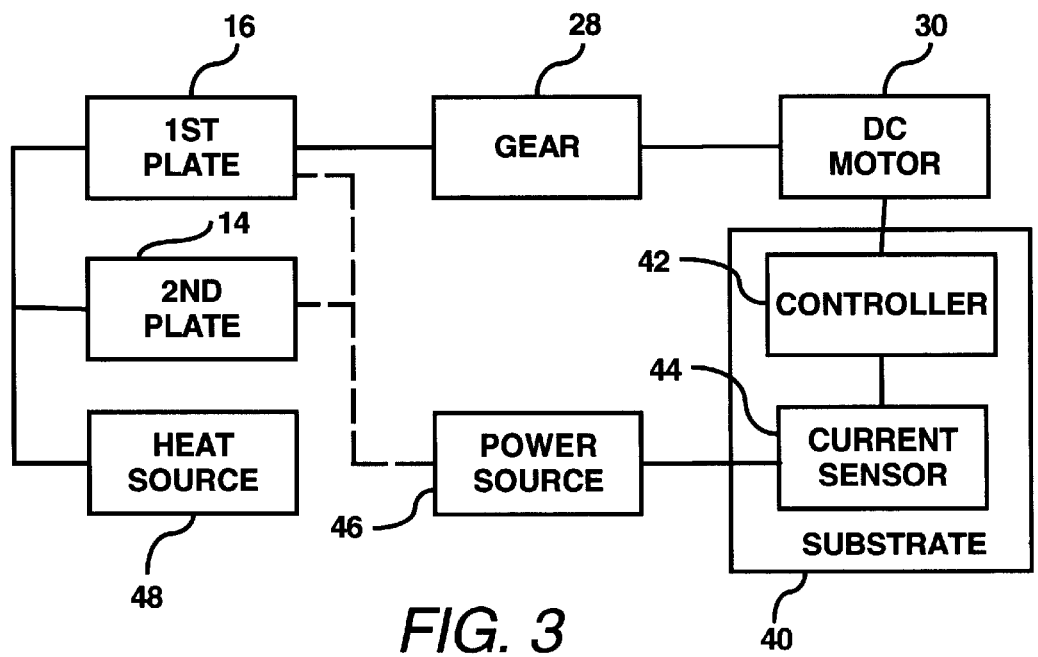
FIG. 3 is a block diagram showing an embodiment of the present invention.

Referring now to FIG. 3, there is illustrated a block diagram of a controller 42 connected to the DC motor 30. The controller 42 generally controls the current supplied to the DC motor 30 as well as the direction of rotation of the motor. A current sensor 44 is additionally provided to measure the amount of current being supplied to the DC motor 30. According to a preferred embodiment of the present invention, the controller 42 and the current sensor 44 are positioned on a substrate 40, e.g., a printed circuit board. However, it is within the purview of the present invention that the controller 42 and/or the current sensor 44 may be positioned separately, or may be positioned on the DC motor 30. Additionally, the controller 42 and the current sensor 44 may be formed as a single component. In any event, the controller 42 draws power in the form of current from a power source 46 and delivers the current to the DC motor 30, with the current sensor 44 detecting the amount of current flowing to the DC motor.

FIG. 3 further illustrates a heat source 48 connected to the second plate 14 and the movable plate 16 to heat the second plate and the movable plate. As an alternative to the use of a separate heat source 48, the second plate 14 and the movable plate 16 may be heated by a variety of other reasonably suitable methods. For example, a plurality of resistors may be provided on at least those surfaces of the movable plate 16 and the second plate 14, which are intended to contact upper and lower surfaces of the plurality of media. In this respect, the plurality of resistors may be connected to the power source 46, such that, the current flowing from the power source to the plurality of resistors may be converted into heat energy.

According to a preferred embodiment of the present invention, the level of heat generated on the surfaces of the movable plate 16 and the second plate 14 may be held constant for each binding operation. However, the heat level may also vary according to the number of media sheets 8 to be bound together.

Figure 4:
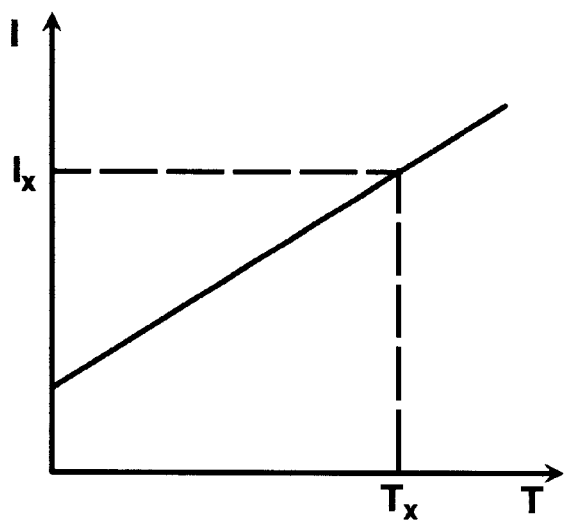
FIG. 4 is a graph showing the generally known substantially proportional relationship between current and torque.

FIG. 4 is a graph showing the substantially proportional relationship between current and torque which is generally known to those having ordinary skill in the art. As seen in FIG. 4, as the amount of current I is increased, the torque T created by the DC motor 30 is also increased in a substantially proportional manner. Thus, at a predetermined torque level ($T_x$), the current level ($I_x$) is known and thus the amount of pressure applied on the plurality of media sheets 8 may be controlled by controlling the amount of current flowing into the DC motor 30. Accordingly, by predetermining the level of pressure desired to be applied on the media sheets 8, a corresponding current level may be determined. Consequently, regardless of the number of sheets of media to be bound, a substantially consistent level of pressure may be applied on the plurality of media sheets by controlling the amount of current supplied to the DC motor 30.

Figure 5:
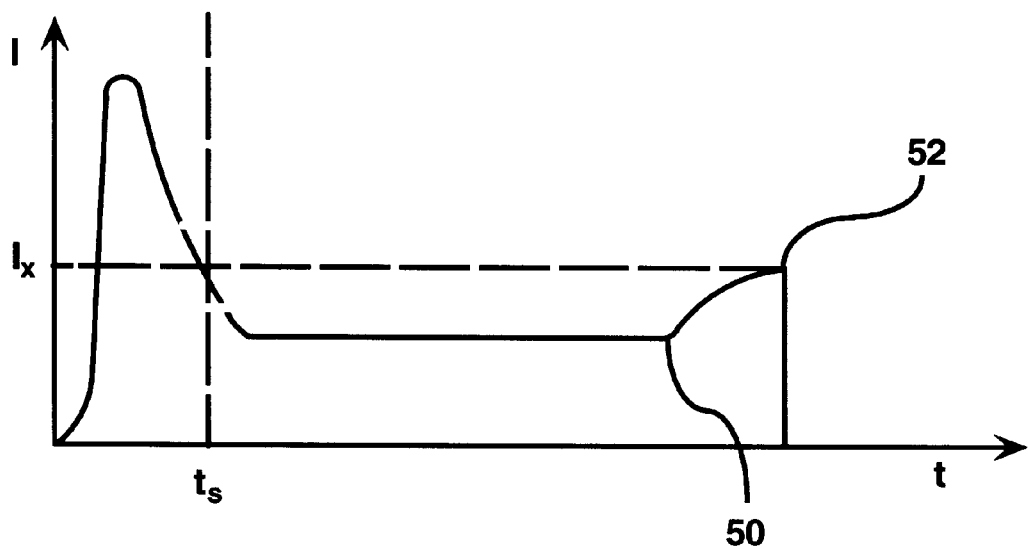
FIG. 5 is a graph showing values of current after the start of a DC motor in accordance with an aspect of the present invention.

FIG. 5 is a graph showing values of current I after the start of a DC motor 30 in accordance with an aspect of the present invention. In FIG. 5, the predetermined pressure level generally occurs when the current I flowing into the DC motor 30 reaches a predetermined level denoted as $I_x$. As illustrated in FIG. 5, for the time period before the start-up time ($t_s$), the current I level reaches levels relatively higher than the predetermined level $I_x$. This occurs because, an initial torque is required due to the inertia immediately after the current I is supplied to the DC motor 30 until an operational speed is reached, as indicated by the substantially straight line illustrated in FIG. 5. Thus, according to the principles of the present invention, the initial spike in current I before the start-up time $t_s$ (e.g., approximately 100 msec) is masked to prevent the controller 42 from shutting off current supply to the DC motor 30 prematurely.

As further illustrated in FIG. 5, as the current I is continuously supplied to the DC motor 30, the current level is maintained at a relatively constant level until such time that the amount of torque required to apply pressure on the plurality of print media begins to increase, as denoted at point 50. Once the current level I reaches point 50, the current level relatively gradually increases until the current level reaches point 52, which generally corresponds to the predetermined current level $I_x$. At this point, the controller 42 operates to shut off the current supply flowing into the DC motor 30. As described hereinabove, once the current supply is shut off, by virtue of the configuration of the threaded jack member 24 and the threaded opening 26, the movable plate 16 is maintained at a substantially constant position with respect to the second plate 14. Thus, by controlling the amount of current flowing into the DC motor 30, the amount of pressure applied on the media sheets 8 may also be controlled regardless of the number of sheets (e.g., thickness).

According to another aspect of the present invention, in use, at least an edge portion of the media sheets 8 containing thermally activated adhesive material between each sheet of media, is inserted into the space 36 formed between the movable plate 16 and the second plate 14. Once the media sheets 8 are inserted into the space 36, the DC motor 30 is activated by operation of the controller 42 to supply current from the power source 46. More specifically, the DC motor 30 is activated to cause the movable plate 16 to move toward the print media sheets 8. In addition, at least a lower surface of the movable plate 16 and an upper surface of the second plate 14 are heated to thus heat the media sheets 8 and the thermally activated adhesive contained between the sheets. The DC motor 30 may be manually activated by a user or it may be automatically activated by operation of, for example, a sensor (not shown) that is configured to detect insertion of the media sheets 8 into the space 36, which triggers the current flow into the DC motor.

The current sensor 44 detects the level of current flowing to the DC motor 30, generally ignoring the initial spike arising during the start-up of the DC motor. As a bottom surface of the movable plate 16 contacts an upper surface of the plurality of media sheets 8, the amount of current required to continue the movement of the movable plate toward the second plate 14 to thus decrease the height of the space 36, increases (as depicted in FIG. 5, point 50). Once the level of current flow into the DC motor 30 reaches a predetermined level ($I_x$) as detected by the current sensor 44, the controller 42 operates to shut off power to the DC motor. As the power to the DC motor 30 is shut off, the height of the space 36 remains relatively constant, consequently, the amount of pressure applied on the media sheets 8 by the movable plate 16 and the second plate 14 is also maintained a relatively constant level. Thus, the amount of pressure applied on the media sheets 8 may be controlled to a predetermined amount regardless of the number of sheets (i.e., media stack thickness) contained in the space 36.

Once the device 10 has applied the predetermined amount of pressure on the media sheets 8 for a selected length of time, the controller 42 may be operated to activate the DC motor 30 to cause the movable plate 16 to move in a direction away from the plurality of media sheets to thus enable the media sheets to be removed from the space 36.

According to the principles of the present invention, the amount of pressure applied on the media sheets 8 during a binding process may be maintained at a predetermined level in a relatively simple manner without suffering from the drawbacks and disadvantages associated with known media binding processes.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A press for binding media, said press comprising:
    a first plate and a second plate, a space being formed between said first plate and said second plate, wherein said space is sufficiently large to enable a plurality of sheets of media to be inserted into said space;
    a jack device threadably attached to at least one of said first and second plates;
    a DC motor for manipulating said jack device, wherein a position of at least one of said first and second plates is varied in response to manipulation of said jack device;
    a power source for supplying power to said DC motor;
    a sensor for detecting an amount of current flowing from said power source to said DC motor;
    a controller for controlling power supply to said DC motor, wherein said controller is configured to shut off the power supply to said DC motor in response to the current reaching a predetermined value; and
    a heat source for supplying heat to at least one of said first plate and said second plate, wherein said heat is configured to be transferred to said media sheets insertable into said space between said first plate and said second plate to thereby bind said media sheets together.

2. The press for binding media according to claim 1, wherein said controller and said sensor are provided on a substrate.

3. The press for binding media according to claim 2, wherein said substrate comprises a printed circuit board.

4. The press for binding media according to claim 1, wherein said jack device is operable to maintain said first and second plates in a position with respect to each other when said DC motor is not operating to manipulate said jack device.

5. The press for binding media according to claim 1, wherein said first plate comprises a threaded opening, said jack device comprises a threaded jack member insertable into said threaded opening of said first plate, and wherein rotation of said threaded jack member is operable to cause the position of said first plate to vary with respect to said second plate.

6. The press for binding media according to claim 5, wherein said jack device is operable to maintain the position of said first plate with respect to said second plate when said threaded jack member is not rotated.

7. The press for binding media according to claim 1, wherein said first and second plates each comprises a pair of edges, said press further comprising a plurality of rods positioned substantially adjacent said edges, wherein at least one of said first and second plates comprises a plurality of holes through which said plurality of rods are slidably inserted.

8. The press for binding media according to claim 1, further comprising a third plate spaced from said first plate.

9. The press for binding media according to claim 8, wherein at least one of said first plate, second plate, or third plate comprises a member for supporting said DC motor.

10. The press for binding media according to claim 1, wherein said heat source comprises a plurality of resistors positioned on said first and second plates and wherein said resistors receive power from said power source.

11. The press for binding media according to claim 1, said press being attached to an output section of an image forming device.

12. A method for binding a plurality of media sheets with a press having a first plate and a second plate spaced from said first plate, at least one of said first and second plates being movable by operation of a DC motor, said method comprising the steps of:
    inserting at least an edge of said media sheets into said space between said first plate and said second plate;
    supplying said DC motor with a current from a power source to thereby activate the DC motor to maneuver at least one of said first plate and said second plate in a direction towards said media sheets;
    controlling said supply of current into said DC motor;
    sensing the amount of current supply to said DC motor;
    controlling an amount of pressure applied on said media sheets by said first plate and said second plate by controlling the amount of current flowing into said DC motor.

13. The method according to claim 12, comprising the further step of:
    heating said first and second plates.

14. The method according to claim 12, comprising the further step of:
    shutting off said DC motor in response to said current flowing into said DC motor reaching a predetermined level, and wherein the position of each of said first plate and said second plate is maintained at a substantially constant level to thereby maintain the pressure applied on said media sheets at a substantially constant level.

15. The method according to claim 12, wherein said step of inserting at least an edge of said media sheets into said space includes the further step of inserting media sheets ejected from an image forming device.

16. The method according to claim 12, comprising the further steps of:
    maneuvering said at least one of said first plate and said second plate in a direction away from said media sheets; and
    removing said media sheets when said space is sufficiently large.

17. A method for controlling pressure applied onto a plurality of media sheets by a media binding device having a first plate and a second plate, wherein at least one of said first and second plates is maneuverable by a DC motor, said method comprising the steps of:
    maneuvering said at least one of said first and second plates into substantial contact with said media sheets;
    maintaining a substantially constant pressure on said media sheets by said first plate and said second plate by substantially shutting off the current flowing into said DC motor when said current flowing into said DC motor reaches a predetermined level.

18. The method according to claim 17, wherein said maintaining step comprises the further step of creating a substantially constant distance between said first plate and second plate to thereby maintain the pressure applied on said media sheets at a substantially constant level.

19. The method according to claim 17, further comprising the step of inserting at least an edge of said media sheets ejected from an image forming device between said first and second plates.

20. The method according to claim 17, comprising the further steps of:
- maneuvering said at least one of said first plate and said second plate in a direction away from said media sheets; and
- removing said media sheets when said space is sufficiently large.

* * * * *